United States Patent
Miles et al.

(10) Patent No.: US 9,201,573 B1
(45) Date of Patent: Dec. 1, 2015

(54) ADAPTIVE GUI PRE-FETCHING

(71) Applicant: EMC Corporation, Hopkinton, MA (US)

(72) Inventors: Norman M. Miles, Bedford, MA (US); Scott E. Joyce, Foxboro, MA (US); Bruce R. Rabe, Dedham, MA (US)

(73) Assignee: EMC Corporation, Hopkinton, MA (US)

( * ) Notice: Subject to any disclaimer, the term of this patent is extended or adjusted under 35 U.S.C. 154(b) by 198 days.

(21) Appl. No.: 13/837,707

(22) Filed: Mar. 15, 2013

(51) Int. Cl.
*G06F 3/0484* (2013.01)

(52) U.S. Cl.
CPC .................. *G06F 3/0484* (2013.01)

(58) Field of Classification Search
USPC .......................................................... 715/745
See application file for complete search history.

(56) References Cited

U.S. PATENT DOCUMENTS

| | | | |
|---|---|---|---|
| 8,255,914 B1 | 8/2012 | Joyce et al. | |
| 8,326,882 B1 | 12/2012 | Desai et al. | |
| 8,655,819 B1 * | 2/2014 | Burkard et al. | 706/45 |
| 8,924,876 B1 | 12/2014 | Joyce et al. | |
| 8,954,880 B1 | 2/2015 | Rabe et al. | |
| 2006/0277271 A1 * | 12/2006 | Morse et al. | 709/217 |
| 2010/0235241 A1 * | 9/2010 | Wang et al. | 705/14.66 |

OTHER PUBLICATIONS

Scott E. Joyce, et al., "Object Building for an Aggregate Object Class Request", U.S. Appl. No. 13/076,925, filed Mar. 21, 2011.
Bruce R. Rabe, et al., "Automatic Layout of Graphical User Interface Screens From Object Data", U.S. Appl. No. 13/799,547, filed Mar. 13, 2013.
Bruce R. Rabe, et al., "Proficiency-Based GUI Adaptation", U.S. Appl. No. 13/833,356, filed Mar. 15, 2013.
Scott E. Joyce, et al., "Custom Help Systems by Runtime Modification of Generic Help Files", U.S. Appl. No. 13/834,465, filed Mar. 15, 2013.

* cited by examiner

*Primary Examiner* — Peiyong Weng
(74) *Attorney, Agent, or Firm* — BainwoodHuang

(57) ABSTRACT

One embodiment is directed to a method performed by a computing device. The method includes (1) receiving a command from a user to initiate a graphical user interface (GUI) session on a client device, the GUI session providing the user with control over a system via a set of GUI pages, (2) selecting, with reference to user profile data associated with the user, a strict subset of the set of GUI pages, the user profile data indicating a plurality of GUI pages of the set of GUI pages that the user has accessed in previous GUI sessions, the strict subset consisting of the plurality of GUI pages, and (3) causing the plurality of GUI pages of the strict subset to be pre-fetched into memory of the client device, the pre-fetched pages being accessible by the user faster than GUI pages which have not been pre-fetched.

16 Claims, 4 Drawing Sheets

ADAPTIVE GUI PRE-FETCHING

BACKGROUND

Management graphical user interfaces (GUIs) allow users to manage systems using on-screen graphical tools, often from locations remote from the systems being managed. A management GUI typically includes many different management GUI pages, which are displayed to a user in various sequences as the user attempts to perform various system management tasks.

Depending on the system being managed, the size of some pages of the management GUI may be rather large. Especially when being run remotely across a network, the large size of some pages can cause large download delays when a user loads a new page of the management GUI. In order to alleviate this delay issue, some conventional systems download all of the management GUI pages of the management GUI to a local machine in advance, while others load as many of the management GUI pages as will fit in local memory in advance.

SUMMARY

The above-described conventional systems for alleviating the delay caused by loading large management GUI pages over comparatively slow connections are not entirely optimal. For example, although the delay may be reduced when loading a management GUI page stored in local memory, the conventional systems experience large initial delays while many of management GUI pages are initially downloaded. Furthermore, in order to fully store the all of the management GUI pages in local memory, a large amount of local memory must be available in order to fit all of the management GUI pages.

Thus, it would be desirable to alleviate the delay caused by loading large management GUI pages over comparatively slow connections even upon initially activating the management GUI and without requiring an excessive amount of local memory. Thus, an improved technique involves adaptively pre-fetching certain management GUI pages based on a pattern of management GUI pages that the user has recently accessed. In some embodiments, the improved technique pre-fetches the management GUI pages in an order indicated by the user's recent usage patterns.

One embodiment is directed to a method performed by a computing device. The method includes (1) receiving a command from a user to initiate a graphical user interface (GUI) session on a client device, the GUI session providing the user with control over a system via a set of GUI pages, (2) selecting, with reference to user profile data associated with the user, a strict subset of the set of GUI pages, the user profile data indicating a plurality of GUI pages of the set of GUI pages that the user has accessed in previous GUI sessions, the strict subset consisting of the plurality of GUI pages, and (3) causing the plurality of GUI pages of the strict subset to be pre-fetched into memory of the client device, the pre-fetched pages being accessible by the user faster than GUI pages which have not been pre-fetched. Other embodiments are directed to a computerized apparatus and a computer program product for performing a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to techniques for adaptively pre-fetching certain management GUI pages based on a pattern of management GUI pages that the user has recently accessed. Some embodiments involve pre-fetching the management GUI pages in an order indicated by the user's recent usage patterns.

Figure 1:
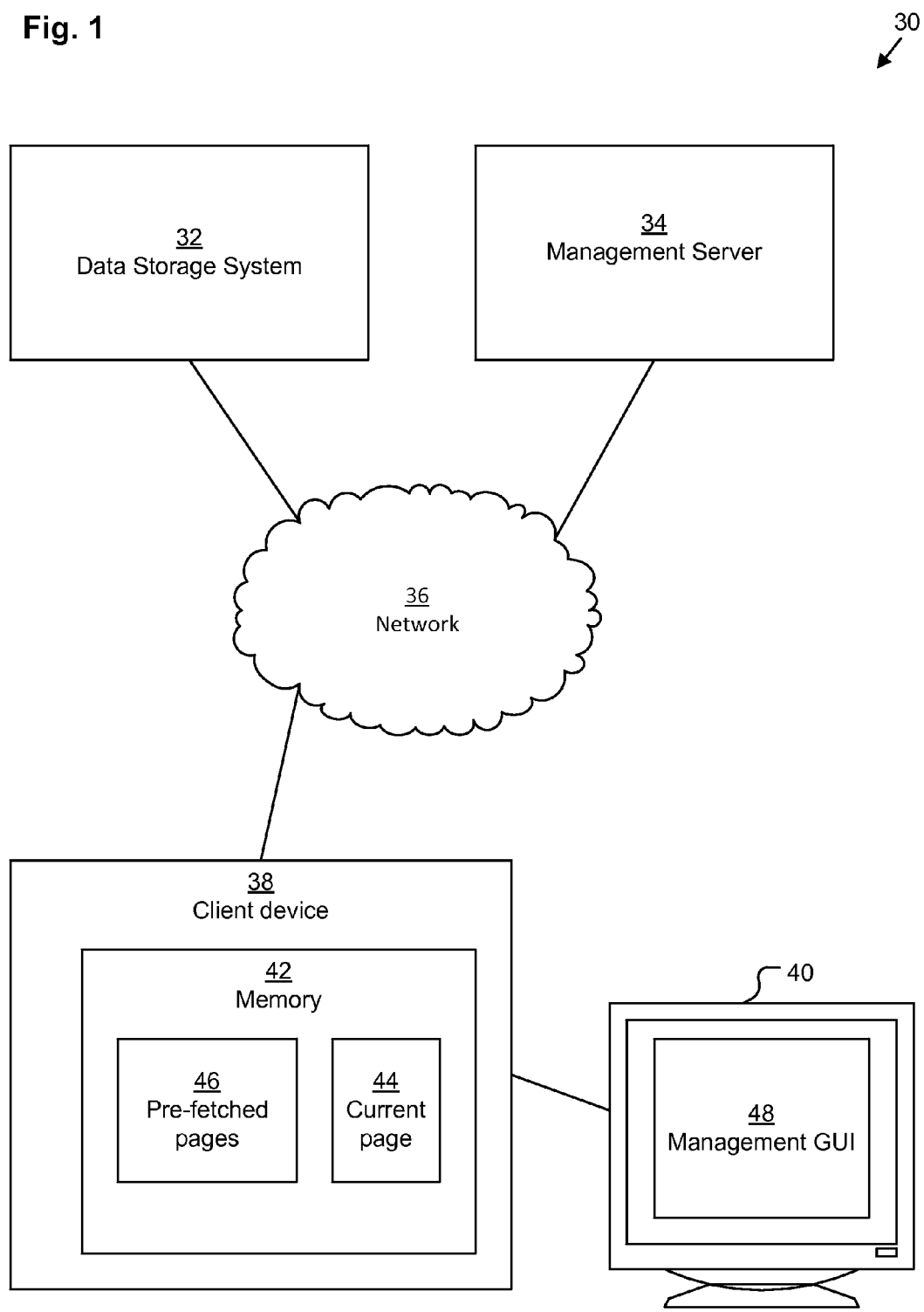
FIG. 1 depicts an example system for use in performing various embodiments.

FIG. 1 depicts an example system 30. System 30 includes a data storage system 32, such as, for example, a NAS data storage system, which provides access to one or more filesystems stored thereon, or a SAN data storage system, which provides block-based access to one or more volumes stored thereon. In some embodiments, data storage system 32 provides both block-based access to logical volumes as well as file-based access to filesystems. In some embodiments, instead of including a data storage system 32, system 30 includes another kind of system to be managed by a user.

System 30 also includes a management server 34. Management server 34 may store a management GUI for use in managing data storage system 32 or some other system requiring management.

System 30 also includes a client device 38 connected to data storage system 32 and management server 34 via a network 36. Network 36 may be any kind of network, such as, for example, a local area network, a wide area network, the Internet, a storage area network, a fabric of interconnected hubs and switches, etc. In some embodiments, in lieu of a network, direct point-to-point connections may be used.

Client device 38 and management server 34 may be any kind of computing devices, such as, for example, a personal computer, a workstation, a server, an enterprise server, a laptop computer, a mobile computer, a smart phone, a tablet computer, etc., although typically, management server 34 is a server or an enterprise server.

A user operates client device 38 in order to display a management GUI 48 on a display device 40 connected to the client device 38 for managing the data storage system 32. Client device 38 stores a current page 44 of the management GUI within memory 42 as well as a set 46 of adaptively pre-fetched GUI management pages.

In some embodiments, the management GUI may be stored entirely within persistent storage of the client device 38 rather than within the management server 34; in such embodiments, the management server 34 and the client device 38 are effectively conflated into a single device.

Display device 40 may be any kind of display device capable of displaying a GUI, such as, for example, a monitor, a television, a cathode ray tube, a liquid crystal display, a plasma display, a light emitting diode display, a touch-sensitive display screen, etc.

Figure 2:
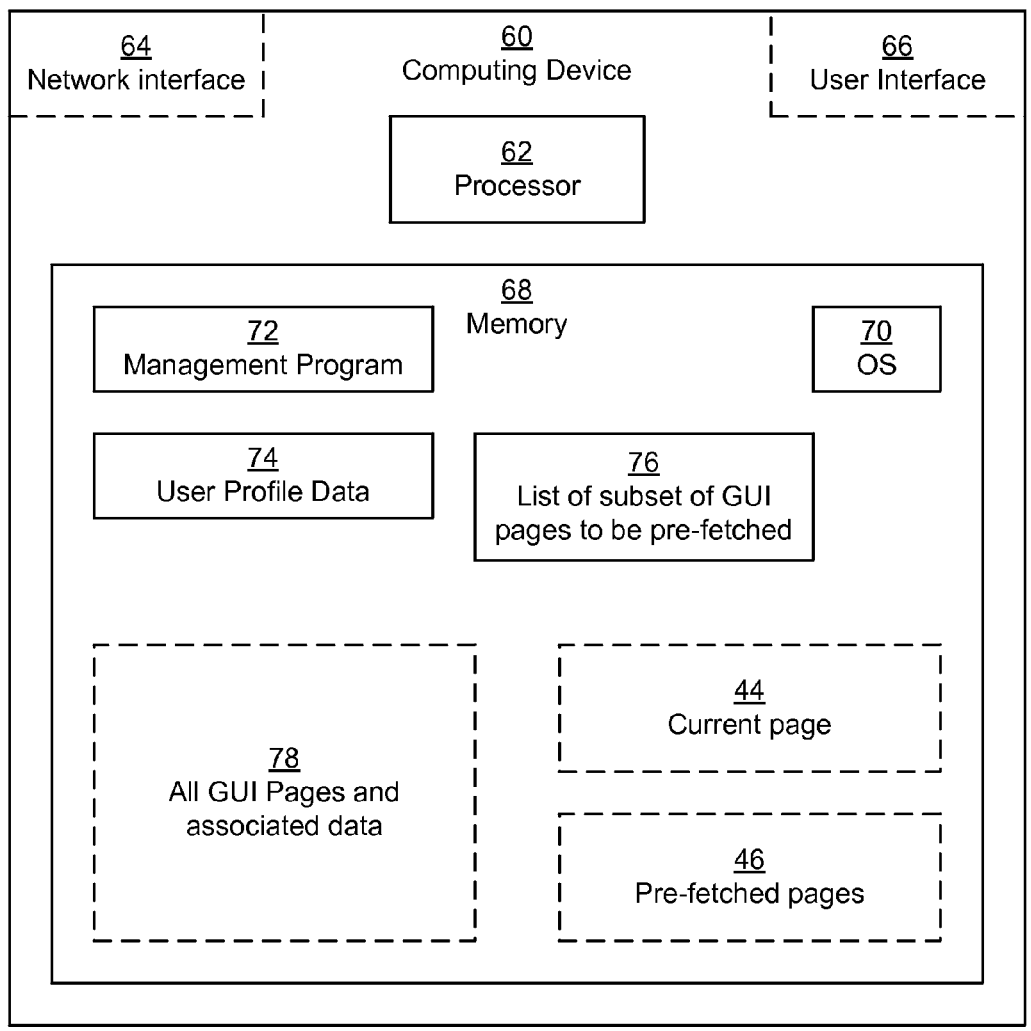
FIG. 2 depicts an example apparatus according to various embodiments.

FIG. 2 depicts an example computing device 60 in which a method is performed as described in further detail below in connection with FIG. 4. Since in some embodiments the method of claim 4 may be performed in client device 38, while in other embodiments the method of claim 4 may be performed in management server 34, computing device 60 may be either client device 38 or management server 34, depending on the embodiment.

Computing device 60 includes a processor 62. Processor 62 may be any kind of processor or set of processors configured to perform operations, such as, for example, a microprocessor, a multi-core microprocessor, a digital signal processor, a collection of electronic circuits, or any combination of the above. Computing device 60 also includes a network interface 64 for interfacing with network 36. When computing device 60 is the client device 38, it also includes a user interface 66 for interfacing with display 40 and user input devices (not depicted).

Computing device 60 also includes memory 68. Memory 68 may be any kind of digital system memory, such as, for example, RAM. Memory 68 stores programs executing on processor 62 as well as data used by those programs. Memory 68 stores an operating system (OS) 70 and a management program 72, both of which run on processor 62. Memory 68 may include both a system memory portion for storing programs and data in active use by the processor 62 as well as a persistent storage portion (e.g., solid-state storage and/or disk-based storage) for storing programs and data even while the computing device 60 is powered off. OS 70 and management program 72 are typically stored both in system memory and in persistent storage so that they may be loaded into system memory from persistent storage upon a system restart. Management program 72, when stored in non-transient form either in system memory or in persistent storage, forms a computer program product. The processor 62 running the management program 72 thus forms a specialized circuit constructed and arranged to carry out the various processes described herein.

Memory 68 also stores user profile data 74 for a particular user and a list 76 of GUI pages to be pre-fetched. Details of the user profile data 74 are provided below in the context of FIG. 3. In embodiments in which the computing device 60 is the client device 38, memory 68 also stores current page 44 and pre-fetched pages 46. In embodiments in which the client device 38 and the management server 34 are conflated, memory 68 also stores the entire set 78 of GUI pages as well (typically in lower-speed persistent storage rather than in RAM) as any associated data needed by those GUI pages.

Figure 3:
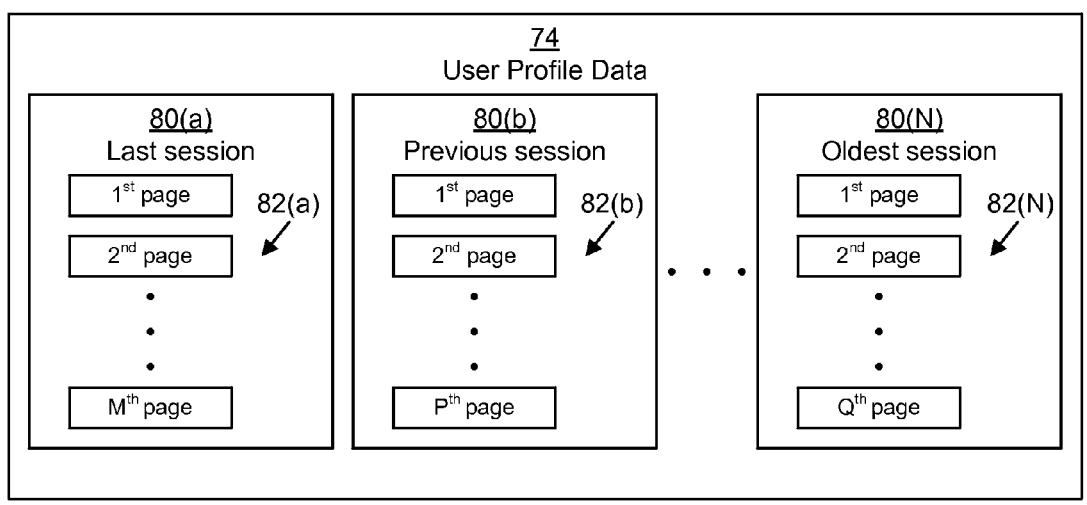
FIG. 3 depicts an example data structure used in conjunction with various embodiments.

FIG. 3 depicts example user profile data 74 in further detail. User profile data 74 includes a series of session elements 80. First session element 80(a) represents a last session (most-recent session) in which the user accessed the GUI. Last session element 80(a) includes a series of GUI page identifiers 82(a) recording the order in which the user accessed GUI pages in his last GUI session, amounting to M total GUI pages accessed in that session.

Second session element 80(b) represents a previous session (second most-recent session) in which the user accessed the GUI. Previous session element 80(b) includes a series of GUI page identifiers 82(b) recording the order in which the user accessed GUI pages in his second most-recent GUI session, amounting to P total GUI pages accessed in that session.

Final session element 80(N) represents an oldest session (least-recent session) in which the user accessed the GUI. Oldest session element 80(N) includes a series of GUI page identifiers 82(N) recording the order in which the user accessed GUI pages in his least-recent GUI session, amounting to Q total GUI pages accessed in that session. It should be understood that there may be a limit to the value of N. Thus, for example, in some embodiments, old session elements 80 are not retained after ten sessions have transpired, N being bounded by the value ten.

In another embodiment (not depicted), user profile data 74 may instead include a list of all pages accessed by the user within his last N sessions, each page identifier also including an indication of which sessions that page was accessed in and at what order within that session.

Figure 4:
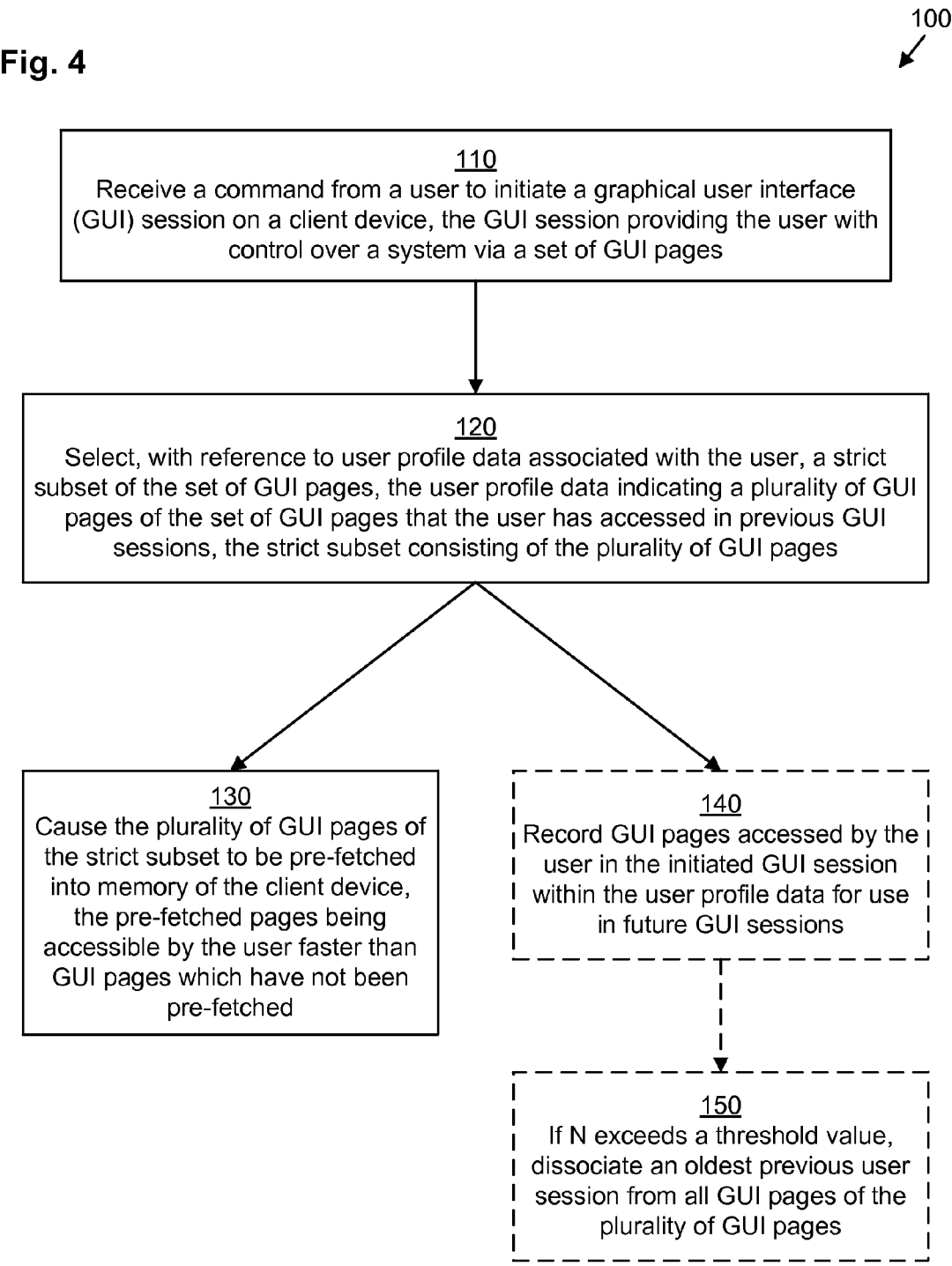
FIG. 4 depicts an example method according to various embodiments.

FIG. 4 illustrates, as method 100, the operation of management program 72 on computing device 60 for adaptively pre-fetching GUI pages 46 according to various embodiments. It should be understood that any time a piece of software, such as, for example, management program 72, is described as performing a method, process, step, or function, in actuality what is meant is that a computing device (e.g., computing device 60) on which that piece of software is running performs the method, process, step, or function when executing that piece of software on its processor (e.g., processor 62). It should also be understood that, in some embodiments, instead of processor 62 executing code of management program 72, specialized circuitry of the computing device 60 operates to perform the method, process, step, or function directly in hardware.

In step 110, computing device 60 receives a command from a user to initiate GUI session on client device 38. The GUI session displays on display 40 as management GUI 48 and provides the user with control over data storage system 32 (or another kind of system) via the set of GUI pages 78.

In step 120, management program 72 selects, with reference to user profile data 74 for the particular user, a strict subset listing 76 of the set of all GUI pages 78 which should be pre-fetched. Thus, strict subset listing 76 only includes GUI page identifiers for pages which have been accessed by the particular user within his last N GUI sessions. In some embodiments, there may be a pre-determined limit to the total number of GUI page identifiers within strict subset listing 76 so that no more than that pre-determined limit of GUI pages may be pre-fetched.

In some embodiments, the strict subset listing 76 of the set of all GUI pages 78 which should be pre-fetched may have an order. Thus, GUI pages which the user has frequently accessed early in recent GUI sessions are given priority. There are various ways to implement an ordering algorithm for choosing this order. One example ordering method might include weighting the first page identified within each session element 80 with a factor of 0.9, the second page within each session element with a factor of 0.8, the third page within each session element with a factor of 0.7, and giving each subsequent page identified within any given session element 80 a progressively lower weight.

In step 130, the management program 72 causes the GUI pages identified by the strict subset listing 76 to be pre-fetched and stored as pre-fetched pages 46 within memory 68. These pre-fetched pages 46 may be loaded upon a user request much more quickly than were those pages not pre-fetched, since loading pages from RAM is faster than loading pages across network 36 or even from local storage. In embodiments in which the strict subset listing 76 is ordered, pages which the user is likely to access early in the current session (as indicated by the pages that the user has accessed early in recent sessions) are pre-fetched first, making it likely that any given page access in the current session will be faster than were adaptive pre-fetching not employed. This is especially the case when pages are frequently accessed in order.

In embodiments in which the client device 38 is conflated with the management server 34, step 130 is performed by management program 72 loading the pages identified by strict subset listing 76 from storage into RAM of memory 68.

In embodiments in which the client device 38 is the computing device 60 distinct from management server 34, step 130 is performed by management program 72 requesting the pages identified by strict subset listing 76 to be downloaded from management server 34.

In embodiments in which the management server 34 is the computing device 60 distinct from client device 38, step 130 is performed by management program 72 sending the pages identified by strict subset listing 76 to client device 38.

In step 140, once a current GUI session has been initiated, GUI pages accessed by the user in the current session are stored in a current session element, which takes its place as session element 80(a), all other session elements being shifted by one position. In step 150, if the number of session elements 80 within user profile data 74 exceeds the maximum limit to the value of N, then that oldest session element 80(N) is removed from the user profile data 74.

In embodiments in which the user profile data 74 includes a list of pages with information for each list item regarding which sessions it was accessed in an in what order, then, in step 140, a current session identifier (together with an order number) is associated with the page identifier for each page accessed during the current session. Then, in step 150, session identifiers for the oldest session are removed from the user profile data 74, and pages with no remaining session identifiers are removed from the user profile data 74 altogether.

Thus, techniques have been described for adaptively pre-fetching certain management GUI pages based on a pattern of management GUI pages that the user has recently accessed. Some embodiments involve pre-fetching the management GUI pages in an order indicated by the user's recent usage patterns.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing device, the method comprising:

receiving a command from a user to initiate a graphical user interface (GUI) session on a client device, the GUI session providing the user with control over a system via a set of GUI pages;

selecting, with reference to user profile data associated with the user, a strict subset of the set of GUI pages, the user profile data indicating a plurality of GUI pages of the set of GUI pages that the user has accessed in previous GUI sessions, the strict subset consisting of the plurality of GUI pages; and causing the plurality of GUI pages of the strict subset to be pre-fetched into memory of the client device, the pre-fetched pages being accessible by the user faster than GUI pages which have not been pre-fetched;

wherein:

the system is a data storage system; and particular GUI pages of the set of GUI pages are associated with particular data storage system management tasks;

certain other GUI pages of the set of GUI pages are associated with certain other storage system management tasks which depend on one of the particular data storage system management tasks having already been performed;

the strict subset of the set of GUI pages includes as least one GUI page of the particular GUI pages of the set of GUI pages, the at least one GUI page being associated with a particular data storage system management task;

the strict subset of the set of GUI pages includes at least one other GUI page of the certain other GUI pages of the set of GUI pages, the at least one other GUI page being associated with another storage system management task which depends on the particular data storage system management task having already been performed; and causing the plurality of GUI pages of the strict subset to be pre-fetched into memory of the client device includes causing the at least one GUI page to be pre-fetched into memory prior to causing the at least one other GUI page to be pre-fetched into memory.

2. A method performed by a computing device, the method comprising:

receiving a command from a user to initiate a graphical user interface (GUI) session on a client device, the GUI session providing the user with control over a system via a set of GUI pages;

selecting, with reference to user profile data associated with the user, a strict subset of the set of GUI pages, the user profile data indicating a plurality of GUI pages of the set of GUI pages that the user has accessed in previous GUI sessions, the strict subset consisting of the plurality of GUI pages; and causing the plurality of GUI pages of the strict subset to be pre-fetched into memory of the client device, the pre-fetched pages being accessible by the user faster than GUI pages which have not been pre-fetched;

wherein:

the user profile data indicating the plurality of GUI pages of the set of GUI pages that the user has accessed in previous GUI sessions includes data associating each GUI page of the plurality of GUI pages with particular previous GUI sessions during which the user accessed that GUI page;

the data associating each GUI page of the plurality of GUI pages with particular previous GUI sessions associates each GUI page with particular previous GUI sessions drawn from N most recent previous GUI sessions;

the data associating each GUI page of the plurality of GUI pages with particular previous GUI sessions drawn from N most recent previous GUI sessions includes a set of N previous user session lists, each previous user session list listing GUI pages accessed by the user in a distinct previous user session;

each previous user session list includes a respective order in which the user accessed the GUI pages in the respective distinct previous user session of that previous user session list;

selecting, with reference to the user profile data associated with the user, the strict subset of the set of GUI pages includes providing an ordering for the plurality of GUI pages of the strict subset based on the orders of the previous user session lists; and causing the plurality of GUI pages of the strict subset to be pre-fetched into memory of the client device includes causing GUI pages of the strict subset which are higher on the ordering to be pre-fetched before pages of the strict subset which are lower on the ordering.

3. The method of claim 2 wherein the method further comprises, after selecting the strict subset of the set of GUI pages, recording GUI pages accessed by the user in the initiated GUI session within the user profile data for use in future GUI sessions.

4. The method of claim 3 wherein:

recording the GUI pages accessed by the user in the initiated GUI session within the user profile data includes associating each GUI page accessed by the user in the initiated GUI session with the initiated GUI session in the user profile data; and the method further comprises, upon recording the GUI pages accessed by the user in the initiated GUI session within the user profile data, if N exceeds a threshold value, dissociating an oldest previous user session from all GUI pages of the plurality of GUI pages.

5. The method of claim 4 wherein:

associating each GUI page accessed by the user in the initiated GUI session with the initiated GUI session in the user profile data includes adding a new user session list to the user profile data, the new user session list listing the GUI pages accessed by the user in the initiated GUI session; and dissociating the oldest previous user session from all GUI pages of the plurality of GUI pages includes removing an oldest previous user session list from the user profile data.

6. The method of claim 2 wherein providing the ordering for the plurality of GUI pages of the strict subset based on the orders of the previous user session lists includes:

for each previous user session list of the user profile data, assigning a maximum weight to a first GUI page accessed by the user during the respective distinct previous user session of that previous user session list and assigning progressively lower weights to other GUI pages accessed by the user during the respective distinct previous user session of that previous user session list according to the respective order of that previous user session;

for each GUI page of the strict subset of GUI pages, summing together the weights assigned to that GUI page in connection with every previous user session list of the user profile data; and ordering GUI pages of the strict subset of GUI pages with higher sums higher within the ordering than GUI pages of the strict subset of GUI pages with lower sums.

7. The method of claim 1 wherein:

the client device is the computing device, the client device being connected to a remote server via a network connection; and causing the plurality of GUI pages of the strict subset to be pre-fetched into memory of the client device includes:

sending a request for each GUI page of the strict subset to the remote server via the network connection; and receiving each GUI page of the strict subset from the remote server via the network connection and storing that GUI page within memory of the client device.

8. The method of claim 1 wherein:

the client device is the computing device; and causing the plurality of GUI pages of the strict subset to be pre-fetched into memory of the client device includes reading each GUI page of the strict subset from a storage device of the client device into memory of the client device.

9. The method of claim 1 wherein:

the computing device is a remote server connected to the client device via a network connection; and causing the plurality of GUI pages of the strict subset to be pre-fetched into memory of the client device includes sending each GUI page of the strict subset from the remote server to the client device via the network connection.

10. A computer program product comprising a non-transitory computer-readable storage medium storing a set of instructions, which, when executed by a computer causes the computer to perform the operations of:

receiving a command from a user to initiate a graphical user interface (GUI) session on a client device, the GUI session providing the user with control over a system via a set of GUI pages;

selecting, with reference to user profile data associated with the user, a strict subset of the set of GUI pages, the user profile data indicating a plurality of GUI pages of the set of GUI pages that the user has accessed in previous GUI sessions, the strict subset consisting of the plurality of GUI pages; and causing the plurality of GUI pages of the strict subset to be pre-fetched into memory of the client device, the pre-fetched pages being accessible by the user faster than GUI pages which have not been pre-fetched;

wherein:

the user profile data indicating the plurality of GUI pages of the set of GUI pages that the user has accessed in previous GUI sessions includes data associating each GUI page of the plurality of GUI pages with particular previous GUI sessions during which the user accessed that GUI page;

the data associating each GUI page of the plurality of GUI pages with particular previous GUI sessions associates each GUI page with particular previous GUI sessions drawn from N most recent previous GUI sessions;

the data associating each GUI page of the plurality of GUI pages with particular previous GUI sessions drawn from N most recent previous GUI sessions includes a set of N previous user session lists, each previous user session list listing GUI pages accessed by the user in a distinct previous user session;

each previous user session list includes a respective order in which the user accessed the GUI pages in the respective distinct previous user session of that previous user session list;

selecting, with reference to the user profile data associated with the user, the strict subset of the set of GUI pages includes providing an ordering for the plurality of GUI pages of the strict subset based on the orders of the previous user session lists; and causing the plurality of GUI pages of the strict subset to be pre-fetched into memory of the client device includes causing GUI pages of the strict subset which are higher on the ordering to be pre-fetched before pages of the strict subset which are lower on the ordering.

11. The computer program product of claim 10 wherein the set of instructions, when executed by the computer further causes the computer to perform the operation of, after selecting the strict subset of the set of GUI pages, recording GUI pages accessed by the user in the initiated GUI session within the user profile data for use in future GUI sessions.

12. The computer program product of claim 11 wherein:

recording the GUI pages accessed by the user in the initiated GUI session within the user profile data includes associating each GUI page accessed by the user in the initiated GUI session with the initiated GUI session in the user profile data; and the set of instructions, when executed by the computer further causes the computer to perform the operation of, upon recording the GUI pages accessed by the user in the initiated GUI session within the user profile data, if N exceeds a threshold value, dissociating an oldest previous user session from all GUI pages of the plurality of GUI pages.

13. The computer program product of claim 12 wherein:

associating each GUI page accessed by the user in the initiated GUI session with the initiated GUI session in the user profile data includes adding a new user session list to the user profile data, the new user session list listing the GUI pages accessed by the user in the initiated GUI session; and dissociating the oldest previous user session from all GUI pages of the plurality of GUI pages includes removing an oldest previous user session list from the user profile data.

14. An apparatus comprising:

memory, the memory storing:

a set of graphical user interface (GUI) pages; and user profile data associated with a user; and a processor, the processor being configured to:

receive a command from a user to initiate a GUI session on a client device, the GUI session providing the user with control over a system via the set of GUI pages;

select, with reference to the user profile data associated with the user, a strict subset of the set of GUI pages, the user profile data indicating a plurality of GUI pages of the set of GUI pages that the user has accessed in previous GUI sessions, the strict subset consisting of the plurality of GUI pages; and cause the plurality of GUI pages of the strict subset to be pre-fetched into memory of the client device, the pre-fetched pages being accessible by the user faster than GUI pages which have not been pre-fetched;

wherein:

the system is a data storage system; and particular GUI pages of the set of GUI pages are associated with particular data storage system management tasks;

certain other GUI pages of the set of GUI pages are associated with certain other storage system management tasks which depend on one of the particular data storage system management tasks having already been performed;

the strict subset of the set of GUI pages includes as least one GUI page of the particular GUI pages of the set of GUI pages, the at least one GUI page being associated with a particular data storage system management task;

the strict subset of the set of GUI pages includes at least one other GUI page of the certain other GUI pages of the set of GUI pages, the at least one other GUI page being associated with another storage system management task which depends on the particular data storage system management task having already been performed; and causing the plurality of GUI pages of the strict subset to be pre-fetched into memory of the client device includes causing the at least one GUI page to be pre-fetched into memory prior to causing the at least one other GUI page to be pre-fetched into memory.

15. The apparatus of claim 14 wherein:

the apparatus is the client device, the client device being connected to a remote server via a network connection; and causing the plurality of GUI pages of the strict subset to be pre-fetched into memory of the client device includes:

sending a request for each GUI page of the strict subset to the remote server via the network connection; and receiving each GUI page of the strict subset from the remote server via the network connection and storing that GUI page within memory of the client device.

16. The apparatus of claim 14 wherein:

the apparatus is a remote server connected to the client device via a network connection; and causing the plurality of GUI pages of the strict subset to be pre-fetched into memory of the client device includes sending each GUI page of the strict subset from the remote server to the client device via the network connection.

\* \* \* \* \*